United States Patent
Dapkus et al.

(10) Patent No.: US 8,850,219 B2
(45) Date of Patent: Sep. 30, 2014

(54) SECURE COMMUNICATIONS

(75) Inventors: Peter Dapkus, Lafayette, CA (US);
Alan Vangpat, Pittsburgh, PA (US);
Nikita Prokopev, San Francisco, CA (US); Forrest Junod, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 246 days.

(21) Appl. No.: 13/005,073

(22) Filed: Jan. 12, 2011

(65) Prior Publication Data

US 2011/0283110 A1 Nov. 17, 2011

Related U.S. Application Data

(60) Provisional application No. 61/334,312, filed on May 13, 2010.

(51) Int. Cl.
 *H04L 29/06* (2006.01)
 *G06F 21/57* (2013.01)
 *H04L 9/32* (2006.01)

(52) U.S. Cl.
 CPC ............ *H04L 9/3234* (2013.01); *G06F 21/577* (2013.01)
 USPC .......................................................... 713/185

(58) Field of Classification Search
 CPC ..................................................... H04L 9/3234
 USPC .......................................................... 713/185
 See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |

(Continued)

OTHER PUBLICATIONS

Schneier, Applied Cryptography, 1996, Wiley and Sons, 30-33 and 52-53.*

(Continued)

*Primary Examiner* — Bradley Holder
(74) *Attorney, Agent, or Firm* — Weaver Austin Villeneuve & Sampson LLP

(57) ABSTRACT

Systems and methods are described for communicating between a client machine and a server. A security token message may be transmitted from the server to the client machine. The security token message may include a first security token. The first security token may include a communication interaction identifier that identifies a communication interaction between the client machine and the server and an action request identifier that identifies an action request message capable of being sent from the client machine to the server to request that an action be performed on the server. An action request message including a second security token and transmitted in association with the communication interaction may be received at the server. When it is determined that the first security token matches the second security token, the requested action may be performed.

29 Claims, 10 Drawing Sheets

(56) References Cited

U.S. PATENT DOCUMENTS

| | | | |
|---|---|---|---|
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,775,687 | B1 * | 8/2004 | Binding et al. ............... 709/203 |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,100,111 | B2 | 8/2006 | McElfresh et al. |
| 7,181,758 | B1 | 2/2007 | Chan |
| 7,269,590 | B2 | 9/2007 | Hull et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,447,684 | B2 | 11/2008 | Bates |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,607,010 | B2 | 10/2009 | Cavanaugh |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,756,843 | B1 | 7/2010 | Palmer |
| 7,779,039 | B2 | 8/2010 | Weissman et al. |
| 7,827,208 | B2 | 11/2010 | Bosworth et al. |
| 7,853,881 | B1 | 12/2010 | Assal et al. |
| 7,890,766 | B2 | 2/2011 | Girouard et al. |
| 7,908,660 | B2 | 3/2011 | Bahl |
| 7,945,653 | B2 | 5/2011 | Zuckerberg et al. |
| 8,005,896 | B2 | 8/2011 | Cheah |
| 8,015,495 | B2 | 9/2011 | Achacoso et al. |
| 8,073,850 | B1 | 12/2011 | Hubbard et al. |
| 8,082,301 | B2 | 12/2011 | Ahlgren et al. |
| 8,085,797 | B2 | 12/2011 | Gruber et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,196,201 | B2 | 6/2012 | Repasi et al. |
| 8,204,906 | B2 | 6/2012 | Dettinger et al. |
| 8,205,255 | B2 | 6/2012 | Benea et al. |
| 8,209,333 | B2 | 6/2012 | Hubbard et al. |
| 8,275,836 | B2 | 9/2012 | Beaven et al. |
| 8,316,051 | B1 | 11/2012 | Burns et al. |
| 8,424,096 | B2 | 4/2013 | Mergen |
| 8,457,545 | B2 | 6/2013 | Chan |
| 8,484,111 | B2 | 7/2013 | Frankland et al. |
| 8,516,591 | B2 | 8/2013 | Fly et al. |
| 2001/0044791 | A1 | 11/2001 | Richter et al. |
| 2002/0002586 | A1 * | 1/2002 | Rafal et al. ............... 709/205 |
| 2002/0072951 | A1 | 6/2002 | Lee et al. |
| 2002/0082892 | A1 | 6/2002 | Raffel |
| 2002/0099936 | A1 * | 7/2002 | Kou et al. ............... 713/151 |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robins |
| 2003/0004971 | A1 | 1/2003 | Gong |
| 2003/0005300 | A1 * | 1/2003 | Noble et al. ............... 713/172 |
| 2003/0014633 | A1 * | 1/2003 | Gruber ............... 713/170 |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0126463 | A1 | 7/2003 | Sistla |
| 2003/0147392 | A1 * | 8/2003 | Hayashi et al. ............... 370/390 |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0255161 | A1 | 12/2004 | Cavanaugh |
| 2004/0260534 | A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0021478 A1* | 1/2005 | Gautier et al. ............ 705/65 |
| 2005/0050555 A1 | 3/2005 | Exley et al. |
| 2005/0091098 A1 | 4/2005 | Brodersen et al. |
| 2005/0132192 A1* | 6/2005 | Jeffries et al. ............ 713/169 |
| 2005/0138413 A1 | 6/2005 | Lippmann et al. |
| 2005/0138421 A1* | 6/2005 | Fedronic et al. ............ 713/201 |
| 2006/0224887 A1* | 10/2006 | Vesikivi et al. ............ 713/166 |
| 2007/0136794 A1* | 6/2007 | Chin et al. ............ 726/5 |
| 2007/0150736 A1* | 6/2007 | Cukier et al. ............ 713/172 |
| 2007/0226785 A1* | 9/2007 | Chow et al. ............ 726/8 |
| 2007/0244855 A1 | 10/2007 | Bates |
| 2007/0300298 A1 | 12/2007 | Goranson et al. |
| 2008/0022407 A1 | 1/2008 | Repasi et al. |
| 2008/0091750 A1 | 4/2008 | Zadrozny et al. |
| 2008/0189788 A1 | 8/2008 | Bahl |
| 2008/0209503 A1 | 8/2008 | Hess et al. |
| 2008/0249972 A1 | 10/2008 | Dillon |
| 2008/0289047 A1 | 11/2008 | Benea et al. |
| 2009/0007271 A1 | 1/2009 | Huang et al. |
| 2009/0037725 A1* | 2/2009 | Farrugia et al. ............ 713/155 |
| 2009/0063415 A1 | 3/2009 | Chatfield et al. |
| 2009/0328182 A1* | 12/2009 | Malakapalli et al. ............ 726/11 |
| 2010/0138905 A1* | 6/2010 | Kass ............ 726/7 |
| 2010/0146269 A1 | 6/2010 | Baskaran |
| 2010/0161973 A1* | 6/2010 | Chin et al. ............ 713/159 |
| 2011/0078197 A1 | 3/2011 | Zurko et al. |
| 2011/0161289 A1 | 6/2011 | Pei et al. |
| 2011/0282908 A1 | 11/2011 | Fly et al. |
| 2011/0283356 A1 | 11/2011 | Fly et al. |
| 2012/0290407 A1 | 11/2012 | Hubbard et al. |

OTHER PUBLICATIONS

Satyanarayanan; Scalable, secure, and highly available distributed file access; Computer : IEEE Computer Society (vol. 23 , Issue: 5 ); May 1990; pp. 9-18; IEEE Xplore.*

Thompson et al.; Certificate-based authorization policy in a PKI environment; Journal ACM Transactions on Information and System Security (TISSEC); vol. 6 Issue 4, Nov. 2003 pp. 566-588; ACM Digital Library.*

U.S. Office Action dated Apr. 25, 2013 issued in U.S. Appl. No. 13/047,544.

U.S. Office Action dated Oct. 25, 2012 issued in U.S. Appl. No. 13/047,549.

U.S. Notice of Allowance dated May 1, 2013 issued in U.S. Appl. No. 13/047,549.

U.S. Notice of Allowance dated Jul. 1, 2013 issued in U.S. Appl. No. 13/047,549.

Shiflett, Chris (Dec. 13, 2004) "Cross-Cite Request Forgeries," Published in php/architect, downloaded on Nov. 18, 2010 at http://shiflett.org/articles/cross-site-request-forgeries, 35 pages.

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Nov. 6, 2013 issued in U.S. Appl. No. 13/047,544.

* cited by examiner

SECURE COMMUNICATIONS

PRIORITY AND RELATED APPLICATION DATA

This application claims priority to Provisional U.S. Patent App. No. 61/334,312, filed on May 13, 2010, entitled "Methods and Systems for Identifying Malicious Code in an On-demand Service Environment", by Dapkus et al., which is incorporated herein by reference in its entirety and for all purposes.

TECHNICAL FIELD

The present disclosure relates generally to information services provided over a data network such as the Internet, and more specifically to providing secure communications.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

DETAILED DESCRIPTION

Figure 1:
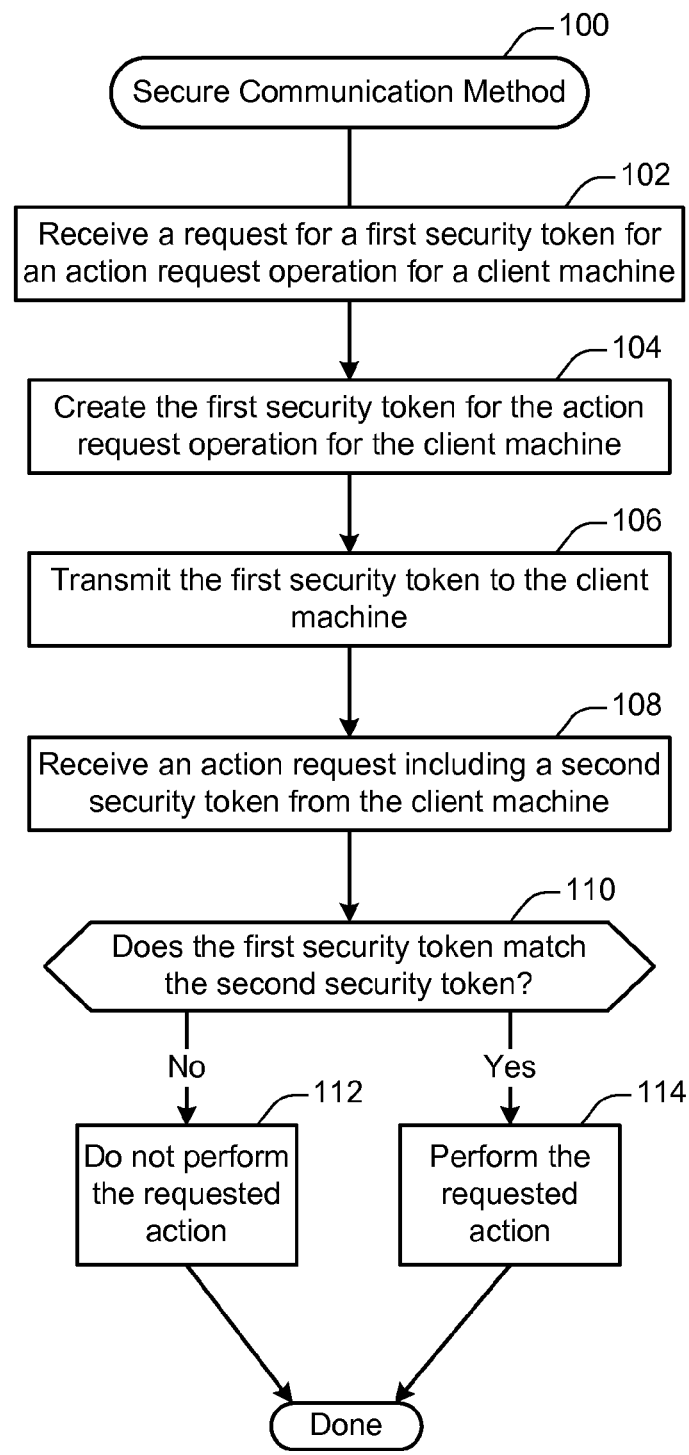
FIG. 1 shows a flow diagram of a method 100 for conducting secure communications, performed in accordance with one embodiment.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

Cross-Site Request Forgery Techniques

One or more embodiments described herein may address a security vulnerability known as cross-site request forgery. Cross-site request forgery, also known as a one-click attack or session riding, is a type of malicious exploit of a website whereby unauthorized commands are transmitted from a user that the website trusts. Cross-site request forgery exploits the trust that a site has in a user's browser.

In some instances, a web browser in which a first web page is loaded from a first network domain will prevent a script running in a second web page loaded from a second domain from accessing information in the browser related to the first web page. However, the second web page may submit action requests, such as HTML form submissions or requests for URL's, to the first domain. If the web browser has established a session with the first domain and the session information is stored in a cookie in the web browser, then the session information may be submitted with the action request submitted by the second web page. Thus, the server receiving the action request may inadvertently believe that the request came from the first web page served from the first domain, when the request actually came from malicious code running in the second web page.

In some instances, a cross-site request forgery attack works by including a link or script in a page that accesses a site to which the user is known (or is supposed) to have been authenticated. In the following hypothetical example, Bob is a user of a bank, and Mallory is a malicious attacker attempting to steal money from Bob's bank account.

For example, Bob might be browsing a chat forum where Mallory has posted a message. Suppose that Mallory has crafted an HTML image element that references an action on Bob's bank's website rather than an image file. An example of such an image file is: <img src="http://bank.example.com/withdraw?account=bob&amount=1000&for=mallory">.

If Bob's bank keeps his authentication information in a cookie, and if the cookie hasn't expired, then the attempt by Bob's browser to load the image will submit the withdrawal form with his cookie. By submitting the withdrawal form with his cookie, Bob will have unintentionally authorized a transaction transferring funds from Bob's account to Mallory.

In some instances, a cross-site request forgery is a type of confused deputy attack against a web browser. The deputy in the bank example is Bob's web browser, which is confused into misusing Bob's authority at Mallory's direction.

In some instances, cross-site request forgery may involve websites that rely on a user's identity. The cross-site request forgery may exploit the website's trust in the user's identity and/or trick the user's web browser into sending HTTP requests to a target site. These HTTP request may have side effects such as triggering unwanted actions at the web server of the target website.

In some instances, web applications at risk from cross-site request forgery include web applications that perform actions based on input from trusted and authenticated users without requiring the user to authorize the specific action. For example, a user who is authenticated by a cookie saved in the user's web browser could unknowingly send an HTTP request to a site that trusts the user and thereby causes an unwanted action.

In some instances, a cross-site request forgery attack may include one or more of the following steps. The attacker may target either a site that doesn't check the "Referrer" header or a victim with a browser or plug-in bug that allows referrer spoofing. The attacker may find a form submission at the target site or a URL that has side effects. The form submission or URL may take an action such as transferring money, or changing the victim's e-mail address or password. The attacker may determine the right values for the form's or URL's inputs. The attacker may lure the victim to a web page with malicious code while the victim is logged in to the target website.

In some instances, an attacker may exploit a cross-site scripting vulnerability at the target website to read a response that the target website sends back to the victim in response to the forged requests. The attacker may simulate multiple "clicks" on links or response forms by including multiple images on a page, or by using a client-side scripting language such as JavaScript® to introduce a delay between clicks.

In some instances, cross-site request forgery attempts pose a significant security risk to web users. Cross-site request forgery attempts may be easy to mount and may be difficult for victims to detect. Because it is carried out from the user's IP address, some website logs might not have evidence of cross-site request forgery. The impact of cross-site request forgery attempts may be limited only by the actions that may be taken by a user on a targeted web site.

In some instances, an attacker may forge a request to log the victim in to a target website using the attacker's credentials. This technique is referred to herein as "login cross-site request forgery." Login cross-site request forgery may allow various forms of attack in addition to those that may be conducted with a single malicious request. For example, an attacker can later log in to the website with the attacker's own credentials and view private information such as activity history that has been saved in the user's account.

In some instances, cross-site request forgery may be implemented a static type of attack that applies to any user. In other instances, cross-site request forgery may be dynamically constructed. For example, a cross-site request forgery message may be dynamically constructed as part of a payload for a cross-site scripting attack. A cross-site scripting attack exploits a web application vulnerability that allows an attacker to bypass client-side security mechanisms normally imposed on web content by modern browsers. By finding ways of injecting malicious scripts into web pages, an attacker can gain elevated access privileges to sensitive page content, session cookies, and a variety of other information maintained by the browser on behalf of the user.

As another example of a dynamic attack, a cross-site request forgery message may be constructed dynamically from session information leaked via offsite content and sent to a target as a malicious URL. For example, cross-site scripting attack code or other code giving the attacker the ability to examine cookies from the target domain may be stored with the application code used to generate the target web page. Using information provided by this stored attack code, a malicious URI that includes the session information could be constructed. As yet another example, cross-site request forgery messages could be sent to a client by an attacker due to session fixation or other vulnerabilities. In a session fixation vulnerability, the attacker may be able to set the session identifier to a value of the attacker's choosing and then use this information to construct a malicious request for the target domain. As another example, cross-site request forgery messages could be guessed via a brute-force attack and rendered on a malicious page that generates thousands of failed requests.

Overview of Prevention Techniques

Various techniques may be used by a website to protect against cross-site request forgery attacks. In some embodiments, these techniques may be used to protect against attacks on a user who is logged in to the website. To prevent forgery of login requests, a website can use cross-site request forgery countermeasures during the login process.

In some embodiments, a website can require authentication in GET and POST parameters. In this case, the user may transmit a password or other secret information not known to an attacker along with the GET or POST parameters. However, this technique may inconvenience the user since the user may be required to resubmit authentication information with every form submission.

In some embodiments, websites may log users off after a period of time. For example, a website may log users off automatically after 15 minutes of inactivity. By periodically logging inactive users off, the probability that the user will encounter a cross-site request forgery while logged in to the website may be decreased. As another example, a website may require users to reconfirm their identity after a period of time, regardless of inactivity.

In some embodiments, using the HTTP specified usage for GET and POST may prevent some attacks. According to the HTTP specified usage, GET requests should not have a permanent effect. This practice in isolation may be insufficient to prevent cross-site request forgery. For example, an attacker can write JavaScript® or ActionScript that invisibly submits a POST form to the target domain. However, filtering out unexpected GETs may prevent some particular attacks, such as cross-site attacks using malicious image URLs or link addresses and cross-site information leakage through <script> elements.

In some embodiments, the HTTP referrer header in a form submission may be checked to determine whether the request is coming from an authorized page. However, a request that omits the referrer header may then be treated as unauthorized because an attacker can suppress the Referrer header by issuing requests from FTP or HTTPS URLs. This strict referrer validation may cause issues with browsers or proxies that omit the Referrer header for privacy reasons. Also, carriage return and line feed injection vulnerabilities in a client machine can be used to spoof the referrer of an HTTP request. Further, the Referrer header may be sent by the client machine and may be vulnerable to attackers who have control over HTTP responses. For example, the Referrer header may be altered via referrer spoofing.

In some embodiments, a website may require users to "double submit" cookies using a client-side scripting language such as JavaScript. If an authentication cookie is read using JavaScript before the post is made, JavaScript's stricter cross-domain rules may be applied. If the server requires requests to contain the value of the authentication cookie in the body of POST requests or the URL of dangerous GET requests, then the request must have come from a trusted domain, since other domains are unable to read cookies from the trusting domain. This, however, relies on the client browser having JavaScript enabled. Further, the client browser would need to provide a standard implementation of JavaScript with accurate cross-domain rules.

In some embodiments, a secret, user-specific token may be required in form submissions and side-effect URL's at a website. The security model of web browsers generally prevents a script executing in one website loaded in the web browser from accessing information associated with another website loaded in the web browser. Thus, the attacker's website cannot put the correct token in its form submissions.

In some embodiments, a security token may be created at the server and stored in a database or other storage location accessible to the server. However, maintaining a database of security tokens may have one or more disadvantages. For example, the storage space needed to maintain the database may be very large. Also, determining the length of time to store unused security tokens may be difficult, since a client machine may wait an indeterminate length of time before submitting an action request. Further, the security token may need to be retrieved from the database to verify that an action request received at the server is trustworthy.

One or more of the drawbacks of maintaining a database of security tokens may be especially severe in certain computing environments. In a highly-scaled, multitenant computing services environment, for example, the computing expense of performing an additional database query with each HTML form submission or other action request may be especially burdensome.

In some embodiments, a security token may be created and transmitted to a client machine and later used to verify an action request from the client machine without storing the security token in a database. The computational savings provided by avoiding an additional database query for many or all action requests transmitted from client machines to servers in a given computing environment may be very large, since some such computing environments handle many thousands of such requests each second.

In some embodiments, creating a security token in a way that it can be later validated without storing the token in a database may be accomplished by creating the security token based on other information associated with the communication interaction between the server and the client machine. This information may be readily available to the server when the server is transmitting or receiving communications with the client machine, without requiring an additional database query to retrieve the token itself. Techniques for creating security tokens, techniques for validating security tokens, and the types of information that may be used to create security tokens are discussed in relation to FIGS. 1-7.

FIG. 1 shows a flow diagram of a method 100 for conducting secure communications, performed in accordance with one embodiment. A server in communication with a client machine may deter cross-site request forgery attacks by requiring the client machine to communicate using the secure communication method 100 when the client machine is submitting a request to make a change in information stored at the server.

In some embodiments, the secure communication method 100 may be used to safely transmit HTML POST requests, HTML GET requests, URLs with side effects, SOAP messages, or any other form of message from the client to the server.

At 102, a request is received for a first security token for an action request operation for a client machine. In some embodiments, the request may be received at a server in communication with a client machine. In some instances, the request may be transmitted from the client machine. For example, the client machine may transmit a request to the server for a web page that contains an HTML form. This request may implicitly indicate to the server that the first security token should be created and sent to the client machine, since receiving a validated security token may be a requirement for the server to process the HTML form if it is subsequently submitted by the client machine to the server.

In some embodiments, the request may not be transmitted from the client machine. For example, the server may be in communication with the client machine via a push interface in which the server can provide information to the client machine even in the absence of a specific request from the client machine. In this case, the server may receive the request for a first security token from another server or from a process running within the server itself.

At 104, the first security token is created. In some embodiments, the first security token may be created using information readily available to the server without incurring the cost of an additional database query. For example, the first security token may be created using one or more session identifiers, session keys, random salt values, server-specific communication keys, action request identifiers, or other information.

In some embodiments, the first security token may be created using encryption, hashing, compression or some other method of securely storing, modifying, or signing information. Further details regarding the creation of security tokens are discussed with respect to FIGS. 2, 3, 5, and 6.

At 106, a communication is transmitted from the server to the client machine. The communication may be crafted so that the client machine has the information necessary to submit a request to the server to take an action or modify information on the server.

The communication includes the security token created at 104. For example, the communication may include the token as part of a query string in an HTML GET request or other URI included in a form provided in the communication. As another example, the communication may include the token as a variable in an HTML POST request included in a form provided in the communication.

At 108, an action request including a second security token is received from the client machine. The action request may be any request to take an action on the server. For example, the action request may be an HTML form submission, a request for an HTML that has side effects on the server, a SOAP message, an e-mail message, or any other type of message.

At 110, a determination is made as to whether the first security token matches the second security token. In some embodiments, an amount of time may have passed since the server created the first security token, and the first security token may not have been stored at the server.

In some embodiments, the security tokens are encrypted. In this case, the second security token received at 108 with the action request can be decrypted. Then, the contents of the decrypted security token can be compared with the information used to create the first security token at 104. Because the information used to create the first security token is readily available to the server and may not require an additional database query to retrieve, the contents of the decrypted security token may be readily compared against the information used to create the first security token without performing an additional database query. Additional details regarding the creation and use of encrypted security tokens are discussed with respect to FIGS. 2-4.

In some embodiments, the security tokens are hashed. In this case, the information used to create the first security token can be retrieved and hashed to create a third security token matching the first security token. Then, the third security token can be compared with the first security token. Further details regarding the creation and use of hashed security tokens are discussed with respect to FIGS. 5-7.

At 112, if it is determined that the first and second security tokens do not match, the requested action is not performed. In some embodiments, the action request may simply be ignored without the server taking further action. Alternately, an indication of the mismatch between the security tokens may be stored in a log or communicated to a user such as an administrator.

In some embodiments, the server may initiate an operation for the action request to be resubmitted. For example, the server may create a new security token and transmit the new security token to the client machine with an indication that the initial action request has been denied.

At 114, if it is determined that the first and second security tokens match, the requested action is performed. Performing the requested action may involve processing an HTML form, providing a web page that has side effects, executing a process at the server, updating information in a database, or any other operations implicated by the requested action. In some embodiments, additional operations may be performed to verify that the requesting party has permission to perform the requested action.

Figure 2:
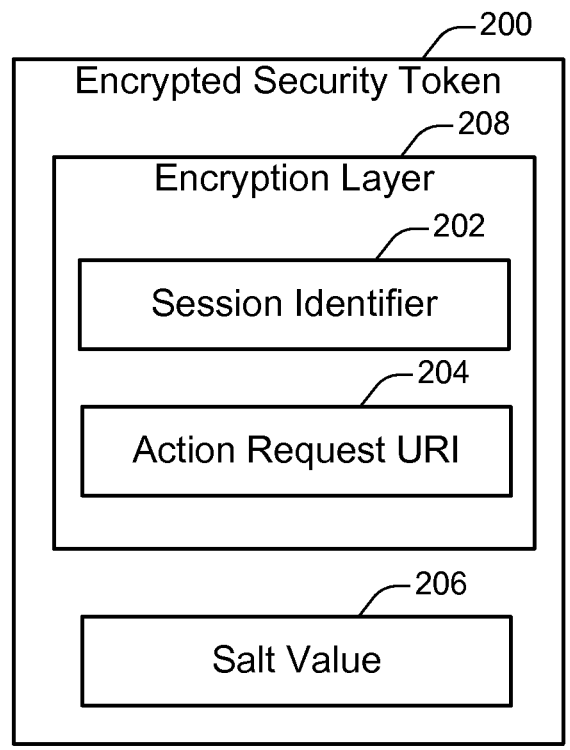
FIG. 2 shows a block diagram illustrating an encrypted security token 200 for use in conducting secure communications, in accordance with one embodiment.

FIG. 2 shows a block diagram illustrating an encrypted security token 200 for use in conducting secure communications, in accordance with one embodiment. The encrypted security token 200 includes a session identifier 202, a requester URI 204, and a salt portion 206. The session identifier 202 and the action request URI 204 are encrypted via encryption layer 208. The session identifier 202 is also referred to herein as a session ID.

In some embodiments, the encrypted security token 200 can be provided by a server to a client machine. When the client machine makes a request for an action at the server, the server can ensure that the client machine submitted the encrypted security token 200 with the request before performing the requested action. Methods for conducting secure communications using an encrypted security token are discussed with respect to FIGS. 3 and 4.

In some embodiments, the session ID 202 may be a communication interaction identifier that identifies a communication interaction, such as a session, between a client machine and a server. The communication interaction may include any ongoing communication between a client machine or user and one or more servers. Accordingly, the session ID 202 may identify one or more sessions, client machines, users, organizations, or any other aspects of a communication interaction. The session identifier 202 may be included in the security token to ensure that two different security tokens for the same action request URI but for different users or sessions have different values In some embodiments, a session refers to a semi-permanent interactive information interchange between two or more communicating devices. In some embodiments, communication sessions may be implemented as part of protocols and services at the application layer, at the session layer, or at the transport layer in the OSI model. For example, an HTTP session is an application layer session that allows associating information with a client machine visiting a website. As another example, a session initiation protocol (SIP) based session is a session layer session that may be used for sessions involving media streams.

In some embodiments, sessions are maintained by a higher level program using a method defined in the data being exchanged. For example, an HTTP exchange between a browser and a remote host may include an HTTP cookie which identifies state, such as a unique session ID, information about the user's preferences or authorization level.

In some embodiments, the session ID 202 may be created or assigned when the session is established. For example, the session ID 202 may be created by use of a session key specific to the server. In this way, many different session IDs may in some cases be created from the same session key. The session may be established when a user connects with the server via the client machine.

In some embodiments, the session may include a log-in or authentication operation. The user may log in by providing authenticating information such as a user name and password.

In some embodiments, the client machine may automatically establish a session with the server. For example, a program running at the client machine may automatically initiate communications with the server to retrieve information.

In some embodiments, the session ID 202 may be stored at the server. For example, the server may maintain a database of active sessions indexed by session ID. The session ID 202 may also be stored at the client machine. For example, the session ID 202 may be stored in a cookie accessible via a web browser. By using a session ID to identify an authenticated communication session, the user may be spared the inconvenience of providing authentication information during every communication with the server.

In some embodiments, the session ID 202 may be readily accessible without performing an additional database query. For example, the session ID 202 may be transmitted from the client machine to the server when the client machine communicates with the server. As another example, the server may have already retrieved the session ID 202 in order to transmit a web page or other communication message to the client machine.

In some embodiments, the action request URI 204 is a communication interaction identifier that identifies a communication interaction between the client machine and the server. The communication interaction identifier may specify a URI at which the client machine can submit an action request, a destination or type associated with an action request, or any other identifying information.

In some embodiments, the action request URI may be included in the security token to ensure that two tokens within the same session but for different URI's have different values. If the same page has two different action request components, then these two forms may have security tokens that differ only in the salt value, not in the action request URI. Alternately, the action request URI may include arbitrary tokens, parameter values, or other information. This information may be used to distinguish between two forms on the same page.

In some embodiments, the action request URI 204 may include any indication of the information that the client machine can send to the server using the security token. For example, the information identifying the communication context may include a URI at which the user can submit an HTML POST or GET request, a URL that has side effects at the server, a header in a SOAP message that directs the server to process the SOAP message in a certain way, or any other information identifying a real or virtual destination at the server for the information transmitted from the client machine.

The salt value 206 is a data value that is used to improve the security of the security token 200. In some embodiments, the salt value 206 may be used as one of the inputs to an encryption function for encrypting the message. Use of the salt value 206 is described in greater detail in FIGS. 3 and 4.

In some embodiments, the salt value 206 may help protect against an attack in which an attacker attempts to guess the requester URI 204 and the session ID 202. For example, the attacker may determine the requester URI 204 to which a form is submitted. The attacker may then create a list or table of possible session IDs. The attacker could encrypt these values to create a dictionary of possibly-valid cross-site request forgery attack tokens. Then, the attacker could create a malicious web page that includes many cross-site request forgery attack messages, with each message including a different possibly-valid token.

With the addition of the salt value 206, however, this attack may fail. Because the salt value 206 is used as input to the encryption algorithm, attacker must guess the salt value as well. In some embodiments, each bit of salt used may double the amount of storage and computation required for attackers to guess the encrypted values.

In some embodiments, the length of the salt value may be strategically determined based on factors such as the desired level of cryptographic security and the amount of communication overhead introduced by the use of the salt value. For example, the salt value 206 may be 16 bits, 16 bytes, 64 bytes, or any other size.

In some embodiments, the salt value 206 may be provided unencrypted with the encrypted security token 200. By including the salt value 206 unencrypted, the client machine can return the salt value 206 to the server when submitting an action request to the server. In this way, the server may decrypt the security token submitted by the client machine with the salt value without having to access a salt value stored in a database, thus potentially avoiding an additional database query.

In some embodiments, the security benefits provided by the salt value 206 may remain even when the salt value 206 is provided in clear text. For example, a potential attacker may not have access to the salt value 206 due to the browser's security model.

In some embodiments, the salt value 206 may provide protection against a dictionary attack and/or a brute force attack against the encrypted security token. In some embodiments, a dictionary attack is an attack in which all the words in an exhaustive list of pre-arranged values, called a dictionary, are successively tried. In a brute force attack, a large proportion of the key space is searched systematically.

The encryption layer 208 encrypts the session ID 202 and the action request URI 204. In some embodiments, the encryption layer 208 may take as an input one or more values other than the session ID 202 and the action request URI 204. For example, the encryption layer 208 may take as an input the salt value 206 and an encryption key.

In some embodiments, the encryption key used to encrypt the encryption layer 208 may include a session key used to encrypt a communication session between the client machine and the server. Alternately, the encryption key may include a server-specific encryption key used to encrypt all security tokens. Additional details regarding encryption techniques are discussed with respect to operation 310 shown in FIG. 3.

In some embodiments, the encryption layer may include additional cryptographic operations. For example, the salt may be combined with the session identifier 202 and the action request URI 204 using an "exclusive or" function, which is also referred to as an XOR function. Applying an XOR function may provide an additional layer of obscurity. In some embodiments, the salt may be repeated and XORed over the length of the session identifier and the action request URI.

In some embodiments, all or a portion of the encrypted security token 200 may be compressed or encoded prior to sending the encrypted security token 200 to the client machine. For example, the encrypted security token 200 may be encoded in base 64 or any other encoding. Compression of the encrypted security token 200 may allow a smaller security token to be transmitted to the client machine. Encoding of the encrypted security token may allow for safer transmission of the security token.

In some embodiments, additional information not shown in FIG. 2 may be included with the encrypted security token. For example, the encrypted security token may include one or more of a type of page, a form identifier (e.g., in the case of more than one forms on the same page), or any other type of identifier. Additional information may be included with the encrypted security token to reduce the number of database calls necessary at the server. For example, information that would normally be determined by implementing a database query at the server may be included with the encrypted security token to avoid making the additional database query.

Figure 3:
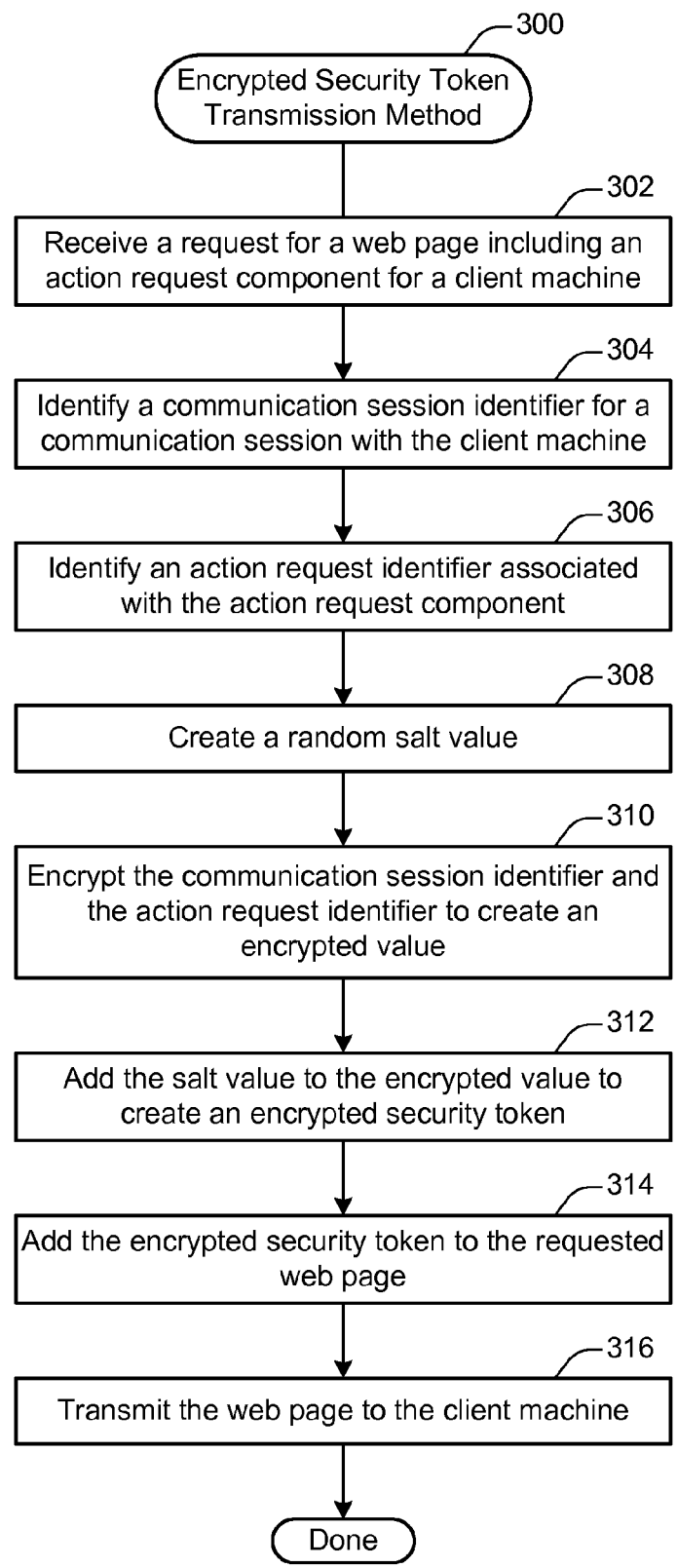
FIG. 3 shows a flow diagram of a method 300 for transmitting an encrypted security token to a client machine, performed in accordance with one embodiment.

FIG. 3 shows a flow diagram of a method 300 for transmitting an encrypted security token to a client machine, performed in accordance with one embodiment. The method 300 may be used to receive a request for an encrypted security token or a web page that contains an encrypted security token, create the encrypted security token, and transmit the encrypted security token and any related information to the client machine. In some embodiments, the method 300 may be used to create an encrypted security token such as the token 200 shown in FIG. 2.

At 302, a web page request is received for a web page including an action request component for a client machine. In some embodiments, the action request component may be an HTML form with which the client machine may communicate information to the server. Alternately, or additionally, the web page may include one or more links to URI's that have side effects when requested at the server.

In some embodiments, the web page request may be received from a client machine. Alternately, the web page request may be generated by another server or by a process operating with the server.

In some embodiments, the web page request may be received within the context of an on-demand service environment providing computing services to various client machines.

Additional details regarding on-demand service environments are discussed with respect to FIGS. 8A-10.

At 304, a communication session identifier associated with the client machine is identified. For example, the session identifier 202 shown in FIG. 2 may be identified.

In some embodiments, the communication session identifier may be received by the server with the request received at 302. For example, the client machine may transmit the communication session identifier with the request.

In some embodiments, the communication session identifier may be retrieved by the server by identifying a source of the request received at 302 or an identifier associated with the client machine.

At 306, an action request identifier associated with the action request component is identified. The action request identifier may include any communication context identifier used to specify a destination or type associated with an information message that the client machine can send to the server. In some embodiments, the action request identifier may be the action request URI 204 discussed with respect to FIG. 2.

In some embodiments, the action request identifier may be identified within the course of creating the requested web page. For example, the process used to create the web page may determine that an HTML form or a link used to submit an action request is submitted at a given URI accessible via the server. This URI may be used as the action request identifier.

At 308, a random salt value is created. The salt value may be, for example, the salt value 206 discussed with respect to FIG. 2. The salt value may include any collection of bits used to cryptographically modify the information used in the encrypted security token. As discussed with respect to FIG. 2, use of a salt value may provide additional protection against certain attacks, such as a dictionary attack.

In some embodiments, the salt value may be created using any technique for creating a random bit string at a server. For example, the salt value may be created dynamically using a random number generator. As another example, the salt value may be retrieved from a previously-computed table of salt values.

At 310, the communication session identifier and the action request identifier are encrypted to create an encrypted value. By encrypting the communication session identifier and the action request identifier, they may be rendered indecipherable to anyone who does not have the key used to encrypt the two values.

In some embodiments, the encrypted value may be created using a private key maintained at the server, as discussed with respect to encryption layer 208 shown in FIG. 2. Additionally, or alternately, the encrypted value may be created using a salt value, such as the salt value created at 308.

Many different encryption techniques exist for encrypting information. Accordingly, the encryption technique used to create the encrypted value may be strategically determined based on factors such as desired levels of security and computational efficiency. In one embodiment, the encryption technique used may be the Advanced Encryption Standard (AES).

In some embodiments, the action request identifier and/or the action request component may be altered using an XOR function and the salt value prior to encryption. For example, the salt value may be repeated across the length of the action request identifier and/or the action request component and the XOR function used to combine the two values. Use of the XOR function may provide additional obscurity to protect against attackers.

At 312, the salt value is added to the encrypted communication session identifier and the form URI to create an encrypted security token. For example, the encrypted security token 200 shown in FIG. 3 may be created.

In some embodiments, the salt value may be placed unencrypted in the encrypted security token. By including the salt value as clear text, the server can use the salt value in a received token to decrypt the encrypted portion of the encrypted security token. As discussed with respect to FIG. 2, the use of the salt value may provide one or more security benefits despite being included as clear text within the encrypted security token.

The salt value may be added to the encrypted value according to a designated schema, such as a schema associated with the encrypted security token 200. The schema may specify the relative locations of the salt value, the encrypted value, and/or any other information within the encrypted security token. By creating the encrypted security token according to a designated schema, the server can decrypt and unroll an encrypted security token received at the server from a client machine to retrieve the component values used to create the encrypted security token.

At 314, the encrypted security token is added to the requested web page. The requested web page may be provided by a different process not shown in FIG. 3. Any technique used to provide a web page from a server to a client machine may be used to create the web page.

In some embodiments, the encrypted security token is added to the web page by inserting the encrypted security token into the document object model (DOM) of the web page. For example, the encrypted security token may be added as a hidden parameter in an HTML form. As another example, the encrypted security token may be added as a parameter in a URL of a link in the web page.

In some embodiments, the encrypted security token may be retrieved by the process used to create the web page. For example, the process used to create the web page may retrieve a security token or other information dynamically and use this retrieved information to construct the requested web page.

At 316, the web page is transmitted to the client machine. In some embodiments, the web page may include content other than the action request component. By using the action request component, the client machine can transmit an action request to the server.

Figure 4:
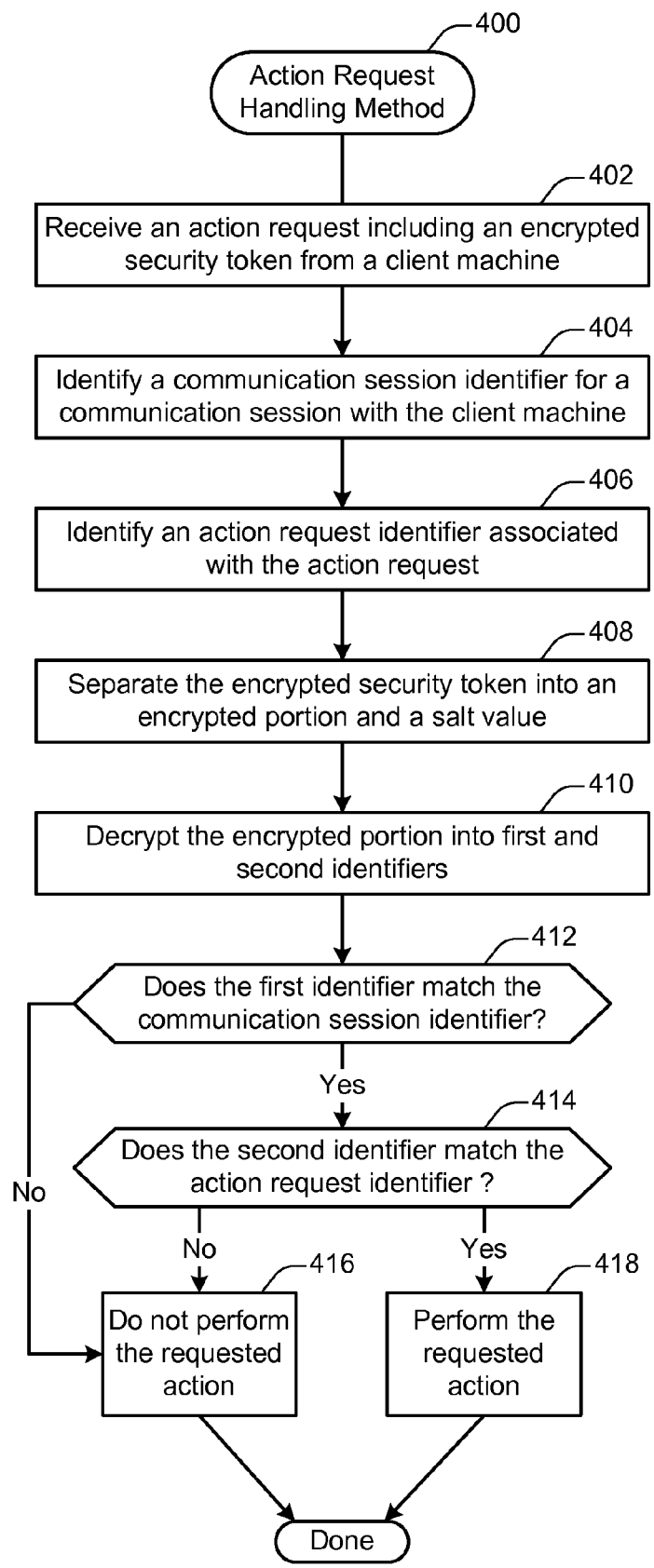
FIG. 4 shows a flow diagram of a method 400 for handling an action request, performed in accordance with one embodiment.

FIG. 4 shows a flow diagram of a method 400 for handling an action request, performed in accordance with one embodiment. The method 400 may be used to handle an action request that includes an encrypted security token such as the token 200 shown in FIG. 2. The method 400 may be used to verify whether a security token received from a client machine matches an encrypted security token that was previously sent to the client machine. For example, the token may have been sent using the method 300 shown in FIG. 3.

At 402, an action request is received from a client machine. The action request includes an encrypted security token. The action request may be received as message sent from the client machine to an address or location at the server.

At 404, a communication session identifier for a communication session with the client machine is identified. In some embodiments, the communication session identifier may be transmitted with the action request. For example, a cookie that includes the communication session identifier may be stored at the client machine. The cookie may be transmitted with the action request. The communication session identifier included in the cookie may be validated and/or used to look up information stored at the server, such as a user associated with the session.

At 406, a communication session identifier for a communication session with the client machine is identified. The communication session identifier may be, for example, the session identifier 202 shown in FIG. 2. In some embodiments, operation 406 may be substantially similar to operation 306 shown in FIG. 3.

At 408, the salt value in the token is identified and separated from the encrypted security token. In some embodiments, the salt value may be stored in a designated portion of the security token. For example, the salt value may be appended to the end of an encrypted value within the security token. As discussed with respect to FIGS. 2 and 3, the salt value may be communicated in clear text to allow it to be used to decrypt the encrypted portion of the encrypted security token without being stored at the server.

At 410, the encrypted portion of the token is decrypted and separated into a first identifier and a second identifier. The decryption operation performed at 410 may be strategically determined based on the technique used to encrypt the security token at 310. In some embodiments, the decryption operation may take as an input a cryptographic key stored at the server, such as a session key. Additionally, or alternately, the decryption operation may take as an input the salt value determined in 408.

At 412, a determination is made as to whether the first identifier matches the communication session identifier for the session with the client. If these two values match, then the action request was submitted within the communication session authorized by the encrypted security token submitted with the action request.

At 414, a determination is made as to whether the second identifier matches the action request identifier. If these two identifiers match, then the action request received at the server was submitted at the destination or address that was authorized by the encrypted security token included with the action request.

In some embodiments, the second identifier and the action request identifier may differ by some amount and still be deemed a match. For example, the action request identifier may be a URI, and the second identifier may include a portion of the URI.

At 416, if a mismatch is detected between the first identifier and the communication session identifier or between the second identifier and the action request identifier, the requested action is not performed. For example, a requested web page may not be provided to the client machine or an HTML form may not be processed.

In some embodiments, the server may initiate an operation allowing the client machine to resubmit the action request. For example, the server may create a new security token and transmit the new security token to the client machine. The server may include information submitted in the action request with the message sent to the client machine so that this information need not be input again at the client machine.

In some embodiments, an entry indicating the mismatch detected at 412 or 414 may be made in a log or transmitted to a user such as a system administrator. In some instances, a mismatch may indicate a problem with the source code used to create a web page or other message that included an action request component. In other instances, a mismatch may indicate a malicious cross-site forgery request attack. By indicating the detection of a mismatch, these problems may be addressed by a service provider associated with the server.

In some embodiments, the operations performed at 416 may differ based on whether the mismatch was detected between the first identifier and the communication session identifier or between the second identifier and the action request identifier. For example, a difference between the first identifier and the communication session identifier may indicate that an otherwise valid security token was submitted from a first web page at the browser after a new session had been established with a second web page at the browser. In this case, the mismatch may not indicate malicious activity. As another example, a difference between the second identifier and the action request identifier may indicate that the user's session has been hijacked and that an attacker is attempting to craft a malicious token to cause an action via the submitted action request.

At 418, if it is determined that the first and second identifiers match, the requested action is performed. Performing the requested action may involve processing an HTML form, providing a web page that has side effects, executing a process at the server, updating information in a database, or any other operations implicated by the requested action. In some embodiments, additional operations may be performed to verify that the requesting party has permission to perform the requested action.

Figure 5:
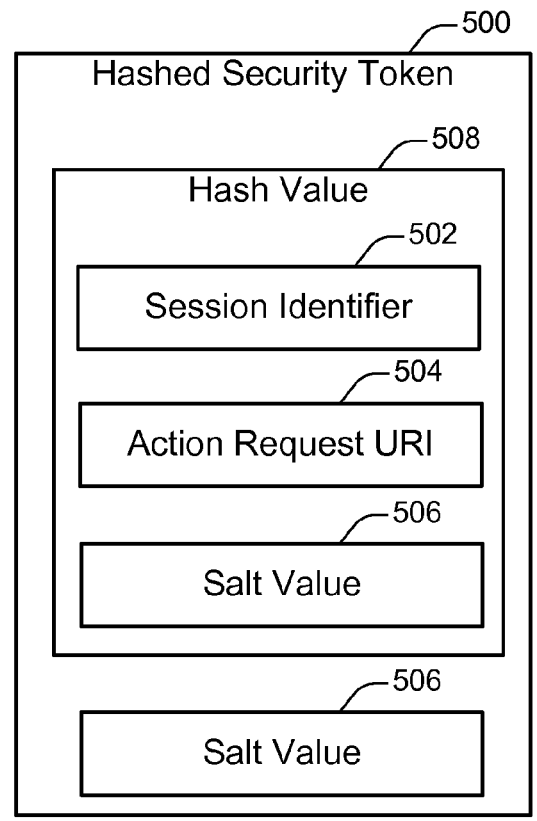
FIG. 5 shows a block diagram illustrating a hashed security token 500 for use in conducting secure communications, in accordance with one embodiment.

FIG. 5 shows a block diagram illustrating a hashed security token 500 for use in conducting secure communications, in accordance with one embodiment. The security token 500 includes a session identifier 502, an action request URI 204, and a salt value 506. These three pieces of information are hashed to create a hash value 508. The salt value 506 is combined with the hash value 508 to create the hashed security token 500.

In some embodiments, the hashed security token 500 may be used to determine the integrity of an action request sent to the server from the client machine.

In some embodiments, the session identifier 502, the action request URI 504, and the salt value 506 may be substantially similar to the session identifier 202, the action request URI 204, and the salt value 206 used to create the encrypted security token 200 shown in FIG. 2.

In some embodiments, the hash value 508 may be determined by applying a hash function to the session identifier 502, the action request URI 504, and the salt value 506. In some embodiments, the hash function may be a deterministic procedure that receives as input a block of data and returns as output a hash value. A change to the input data should result in a change to the hash value.

In some embodiments, the hash function may be referred to as a message authentication code (MAC) algorithm. The hash value 508 may be referred to as a MAC, a hashed MAC (HMAC), a message digest, a digest, or a tag.

In some embodiments, the hash function used to create the hash value 508 may take as an input a cryptographic key. For example, the cryptographic key may be a session key used to encrypt communication between the server and the client machine.

In some embodiments, the hash function may have one or more of the following properties: it is easy to compute the hash value for a given message; it is difficult to find a message that has a given hash value; it is difficult to modify a message without the hash value being changed; and it is difficult to identify two different messages with the same hash value.

Many different techniques exist for hashing information. Accordingly, the hashing technique used to create the hashed value may be strategically determined based on factors such as desired levels of security and computational efficiency. For example, one or more of the following hash functions may be used to create the hash value 508: MD4, MD5, SHA-1, SHA-2, Skein, BLAKE, CubeHash, J H, Keccak, or RadioGatún. In one embodiment, the hashing technique used may be an AES-based hash.

The salt value 506 may be incorporated into the hash value 508 in various ways. In some embodiments, the hash function used to create the hash value 508 may take as an input the salt value 506. Alternately, or additionally, the salt value 506 may be combined using an XOR operation with one or more other inputs to the hashing function. Alternately, or additionally, the salt value 506 may be appended to the session identifier 502 and the action request URI 504 prior to hashing these values.

In some embodiments, an attacker may not have direct access to the hashed security token 500. The hashed security token 500 may be transmitted from the server to the client machine within a web page or other protected format. In the case of a web page, the web browser's security model may prevent web pages served from different domains from accessing the web page that contains the security token.

In some instances, the attacker may have access to or be able to guess some of the information used to create the hashed security token 500. For example, the attacker may have previously received and analyzed the web page used to submit the action request (e.g., via a different user session). As another example, the attacker may apply a dictionary-based attack to guess the session identifier 502.

However, despite having access to some of the information used to create the hash value 508, the attacker may not be able to guess the value of the hashed security token 500. For example, the attacker may not have access to the salt value 506. As another example, the attacker may not have access to a cryptographic key used to create the hash value 508.

In some embodiments, the server may be capable of recreating the hashed security token 500 when an action request is received from the client machine. If the recreated hashed security token matches the security token submitted with the action request, then the server can trust that the action request is authentic and not a cross-site request forgery attempt. Additional details regarding the creation and use of the hashed security token 500 are discussed with respect to FIGS. 6 and 7.

In some embodiments, a hashed security token may be of smaller size than an encrypted security token. The hash value 508 may contain significantly less information than the combination of the session identifier 502, the action request URI 504, and the salt value 506. For example, the hash value 508 may have a size between 128 bits and 4096 bits.

In some embodiments, hashing rather than encrypted the security token may provide performance benefits. In many cases, hashing operations may be quicker to perform than encryption and decryption operations.

Figure 6:
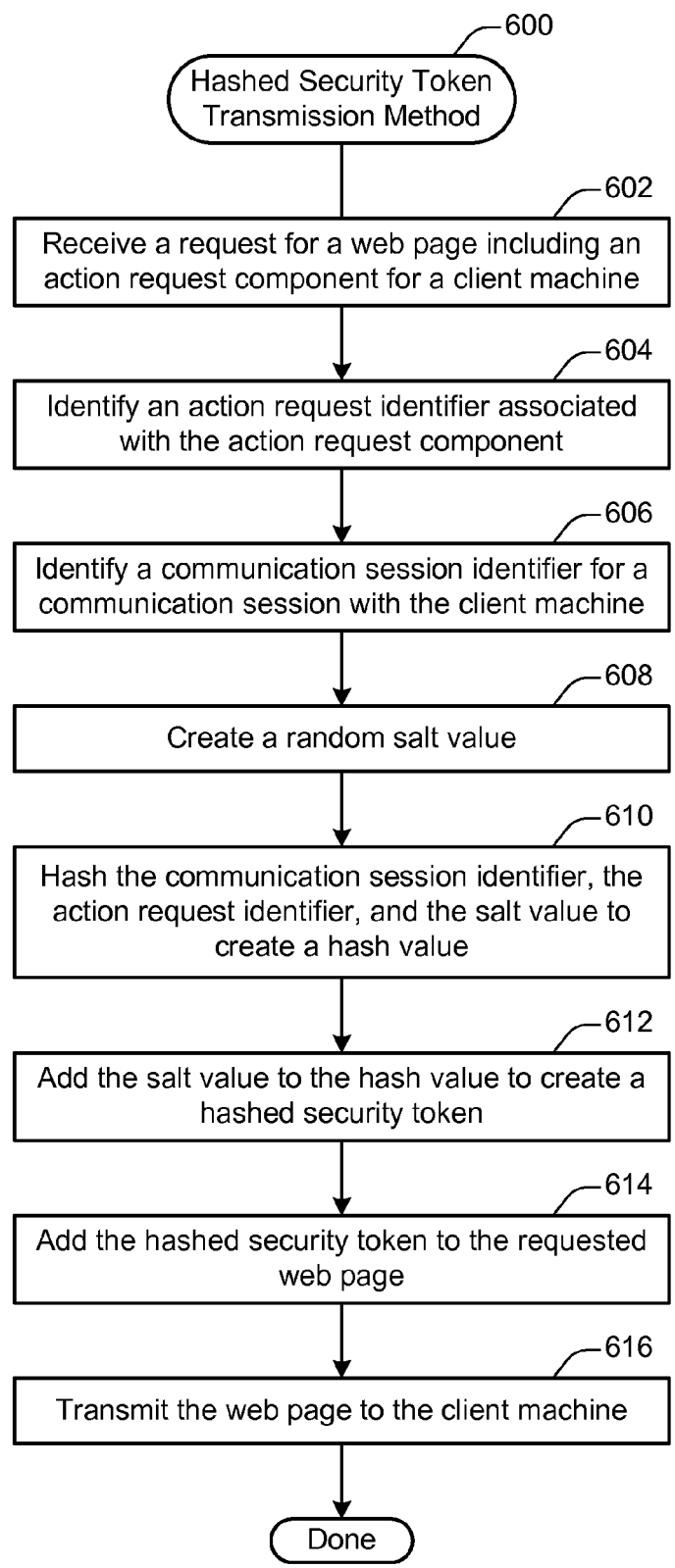
FIG. 6 shows a flow diagram of a method 600 for transmitting a hashed security token to a client machine, performed in accordance with one embodiment.

FIG. 6 shows a flow diagram of a method 600 for transmitting a hashed security token to a client machine, performed in accordance with one embodiment. The method 600 may be used to receive a request for a hashed security token or a web page that contains a hashed security token, create the hashed security token, and transmit the hashed security token and any related information to the client machine. In some embodiments, the method 600 may be used to create a hashed security token such as the token 500 shown in FIG. 5.

At 602, a request is received for a web page including an action request component for a client machine. In some embodiments, one or more of the operations 602-608 shown in FIG. 6 may be substantially similar to operations 302-308 shown in FIG. 3.

At 604, an action request identifier associated with the action request component is identified. The action request identifier may be, for example, the action request URI 504 shown in FIG. 5.

At 606, a communication session identifier for a communication session with the client machine is identified. The communication session identifier may be, for example, the session identifier 502 shown in FIG. 5.

At 608, a random salt value is created. The random salt value may be, for example, the salt value 506 shown in FIG. 5.

At 610, the communication session identifier, the action request identifier, and the salt value are hashed to create a hash value. The result of the hashing may be, for example, the hash value 508. Additional details regarding hashing functions and the creation of hash values are discussed with respect to the hash value 508 shown in FIG. 5.

At 612, the salt value is added to the hash value to create a hashed security token. For example, the hashed security token 500 shown in FIG. 5 may be created. In some embodiments, the salt value may be combined with the hashed value in a manner similar to the combination of the salt value and the encrypted value discussed with respect to operation 310 in FIG. 3.

At 614, the hashed security token is added to the requested web page. At 616, the web page is transmitted to the client machine. In some embodiments, one or both of the operations 614 and 616 shown in FIG. 6 may be substantially similar to operations 314 and 316 shown in FIG. 3.

Figure 7:
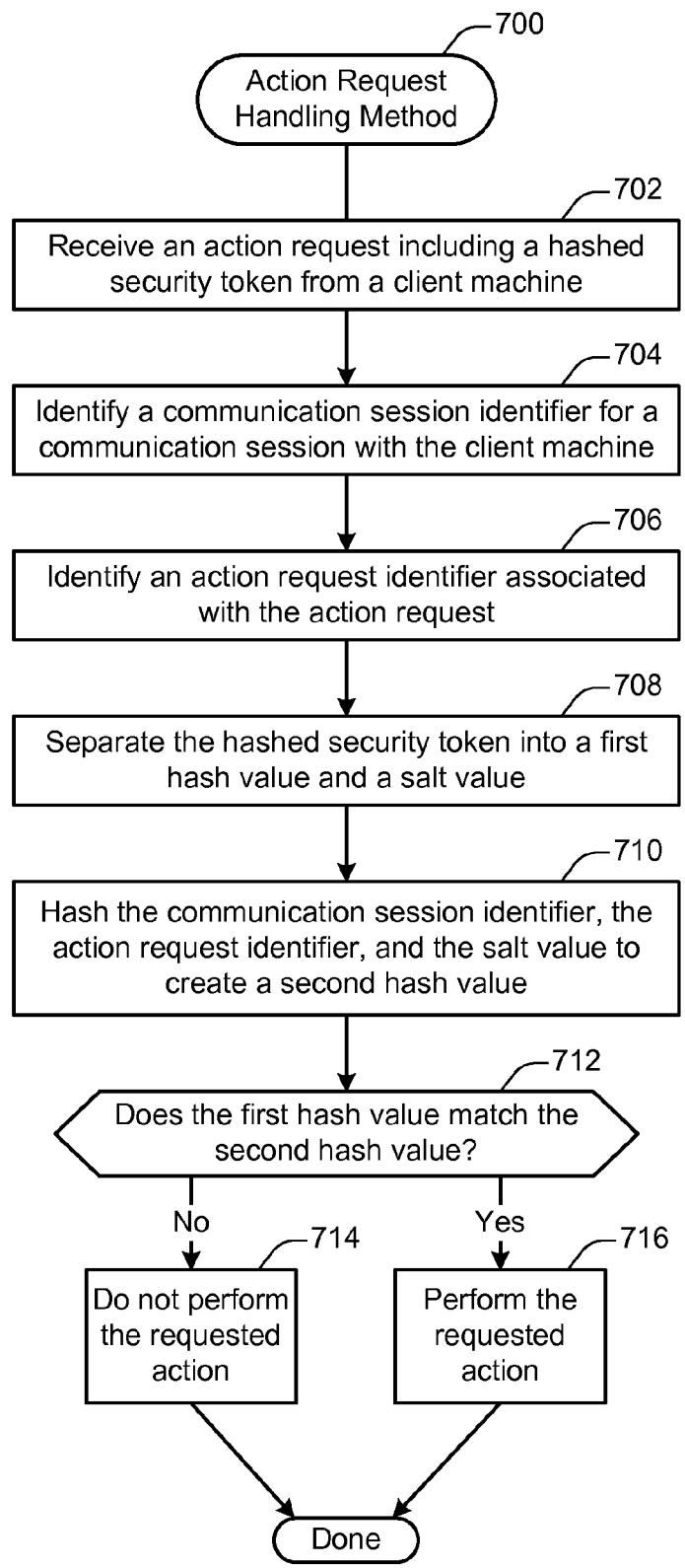
FIG. 7 shows a flow diagram of a method 700 for handling an action request, performed in accordance with one embodiment.

FIG. 7 shows a flow diagram of a method 700 for handling an action request, performed in accordance with one embodiment. The method 700 may be used to handle an action request that includes a hashed security token such as the token 500 shown in FIG. 5. The method 700 may be used to verify whether a security token received from a client machine matches a hashed security token that was previously sent to the client machine. For example, the token may have been sent using the method 600 shown in FIG. 6.

At 702, an action request including a hashed security token is received from a client machine. At 704, a communication session identifier for a communication session with the client machine is identified. At 706, an action request identifier associated with the action request is identified. In some embodiments, one or more of the operations 702-706 may be substantially similar to the operations 402-406 shown in FIG. 4.

At 708, the hashed security token received from the client machine may be separated into a first hash value and a salt value. The hashed security token may be separated by determining size and/or location information of the first hash value and/or the salt value. The size and/or location information may be determined based on information used to create the hashed security token. For example, the salt value may be the first or last 16 bytes of the hashed security token.

At 710, the communication session identifier, the action request identifier, and the salt value are hashed to create a second hash value. The operation 710 may be substantially similar to the operation 610 shown in FIG. 6.

At 712, a determination is made as to whether the first hash value matches the second hash value. The determination may be made using any available technique for comparing the two hash values. For example, the two hash values may be compared via a bitwise comparison, a string comparison, or any other technique.

At 714, the requested action is not performed if the first and second hash values do not match. At 716, the requested action is performed if the first and second hash values do match. In some embodiments, either or both of the operations 714 and 716 may be substantially similar to the operations 416 and 418 shown in FIG. 4.

Although some embodiments described herein use a salt value, a security token may be created without using the salt value. For example, a communication context identifier such as an action request URI and a communication interaction identifier such as a session key may be encrypted or hashed using a session key or other encryption key without using a salt value.

In some embodiments, the methods described herein may be initially implemented using a silent mode in which action requests are not denied even if the client machine submits an invalid token. In this way, problems with the way that developers use security tokens may be detected and fixed so that legitimate action requests are not mistakenly denied.

In some embodiments, the techniques described herein may be incorporated into frameworks or programming languages for providing user interface components to client machines. Alternately, or additionally, the techniques described herein may be implemented in a stand-alone library for page developers to call when creating or verifying a token.

In some embodiments, the techniques described herein may be used to apply to both HTML GET and POST form methods. In this way, third party pages authorized to interact with the server and designed to use a GET method of submitting information to the server may not be inadvertently broken.

Figure 8A:
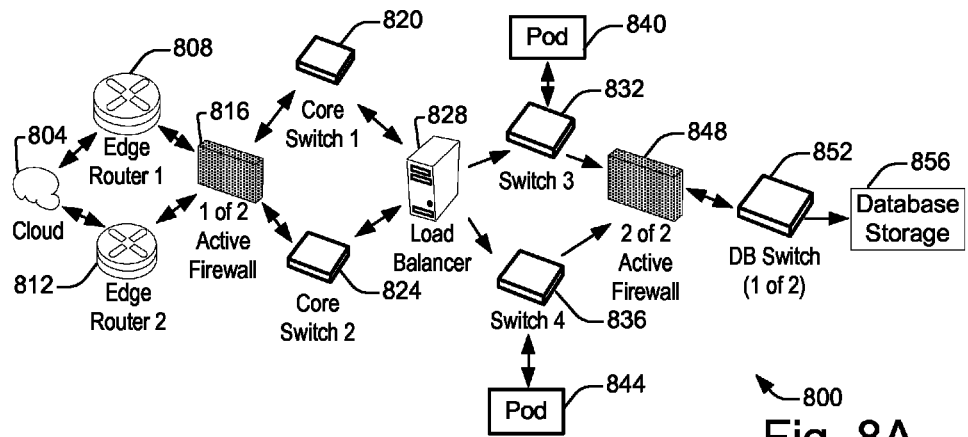
FIG. 8A shows a system diagram 800 illustrating architectural components of an on-demand service environment, in accordance with one embodiment.

FIG. 8A shows a system diagram 800 illustrating architectural components of an on-demand service environment, in accordance with one embodiment.

A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
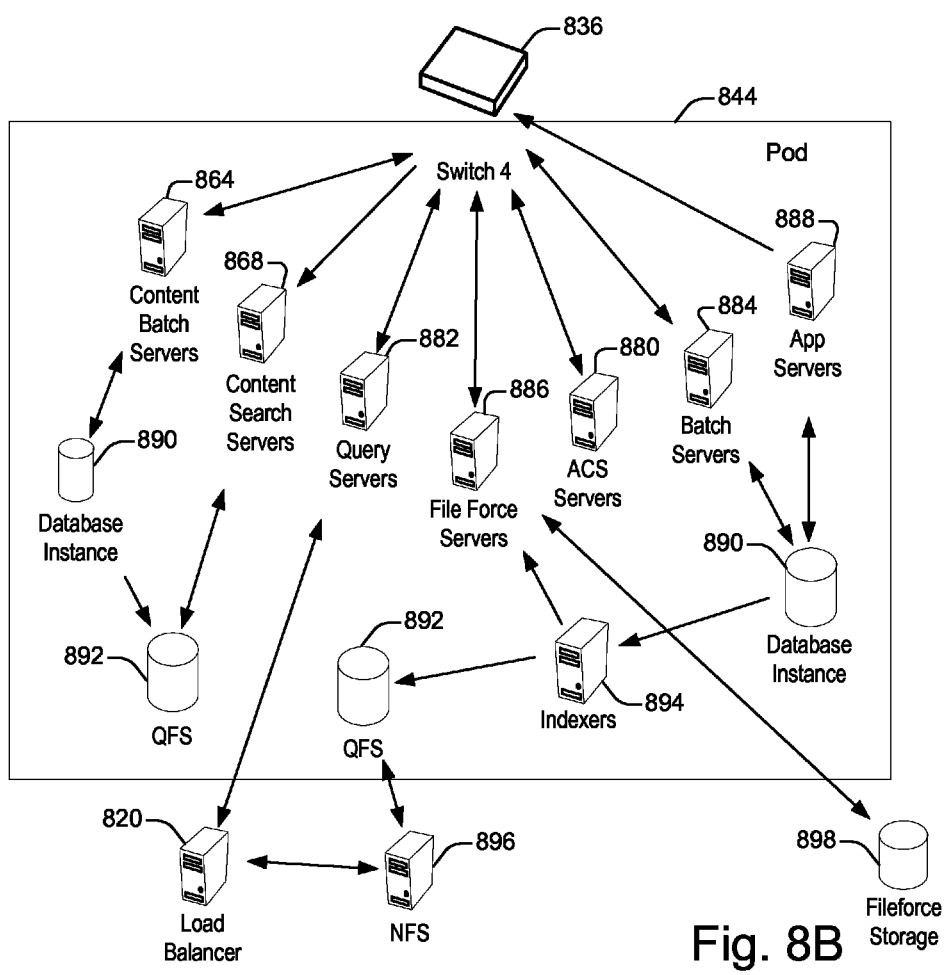
FIG. 8B shows a system diagram further illustrating architectural components of an on-demand service environment, in accordance with one embodiment.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856.

In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800.

In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein.

The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment.

The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs.

In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed.

In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call.

In some embodiments, database information may be transmitted to the indexer 894. Indexer 894 may provide an index of information available in the database 890 and/or QFS 892. The index information may be provided to file force servers 876 and/or the QFS 892.

Figure 9:
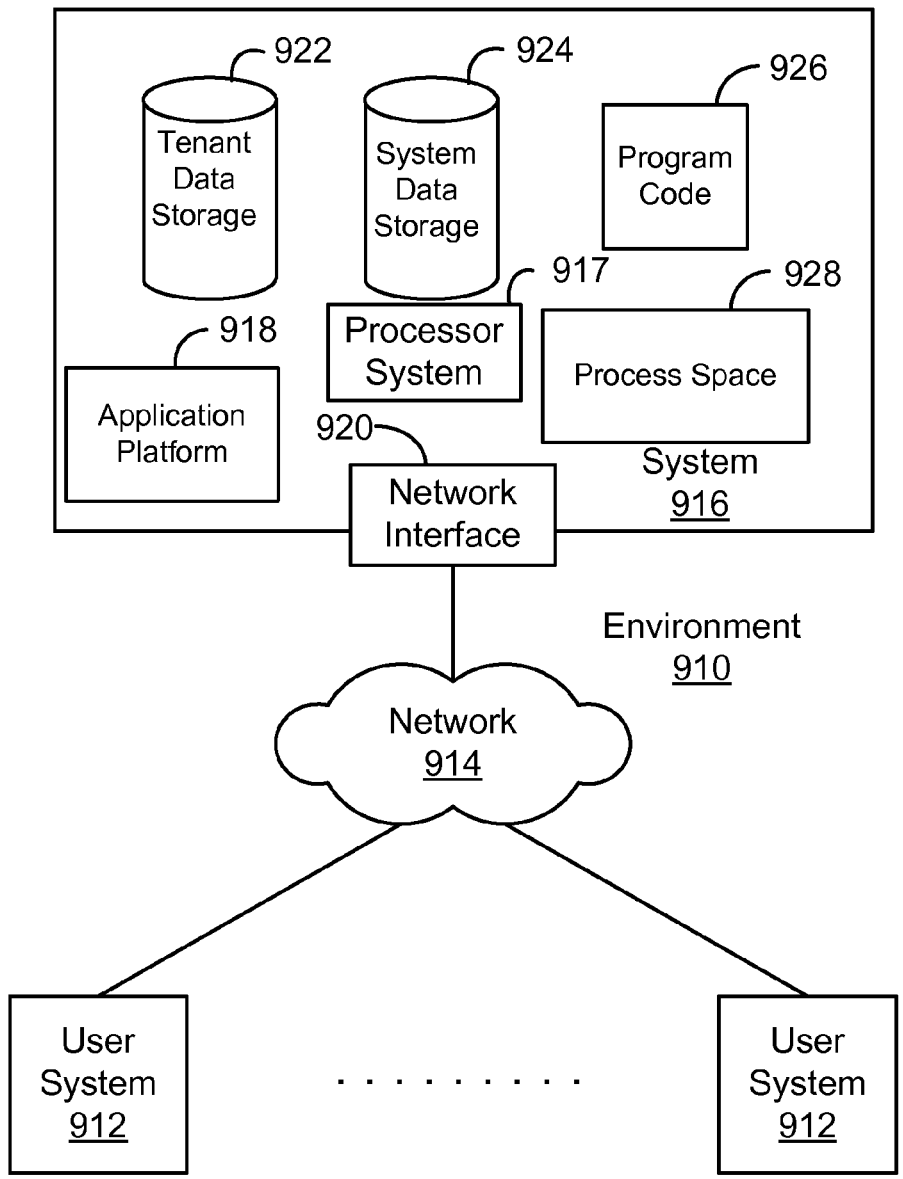
FIG. 9 shows a system diagram 910 illustrating the architecture of a multitenant database environment, in accordance with one embodiment.

FIG. 9 shows a block diagram of an environment 910 wherein an on-demand database service might be used, in accordance with one embodiment.

Figure 10:
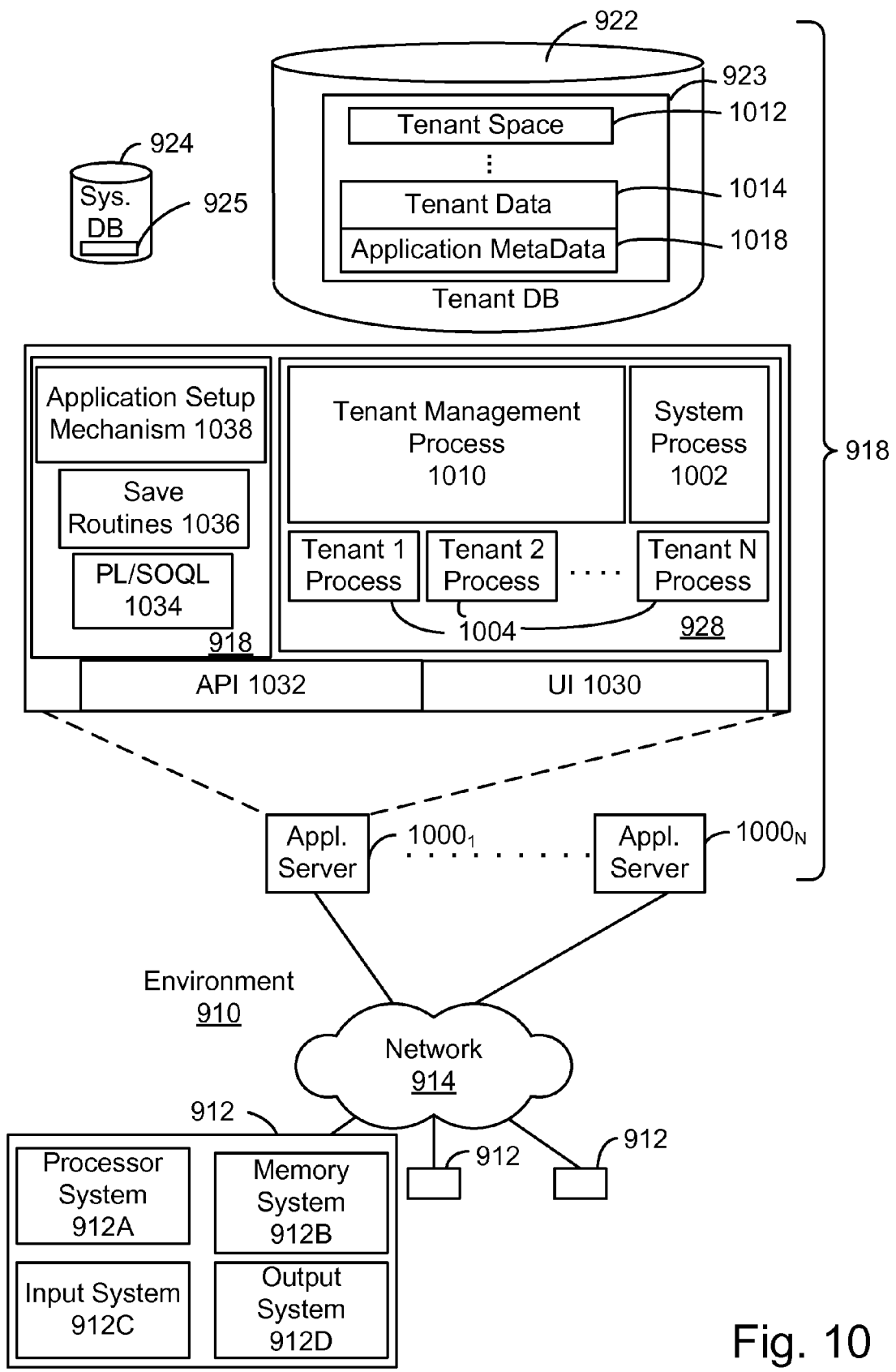
FIG. 10 shows a system diagram 910 further illustrating the architecture of a multitenant database environment, in accordance with one embodiment.

Environment 910 includes an on-demand database service 916. User system 912 may be any machine or system that is used by a user to access a database user system. For example, any of user systems 912 can be a handheld computing device, a mobile phone, a laptop computer, a work station, and/or a network of computing devices. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with one embodiment. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N−1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level.

Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method of communicating between a client machine and a server in an active web browsing session, the method comprising:

transmitting, during an active web browsing session between a web browser of a client machine and a website provided by a server of a first network domain, the active web browsing session being a time during which communications are established between the client machine and the server for exchanging information, a security token message from the server to the client machine, the security token message including a first security token, the first security token comprising a first browser session identifier that identifies the active web browsing session, the first security token further comprising a first action request identifier associated with a first action request message configured to be sent from the client machine to the server to request that an action be performed on the server to modify information stored by the server, wherein the security token message is transmitted to the client machine without storing the first security token in a persistent storage location on the server;

receiving, during the active web browsing session, a second action request message including a second action request identifier at the server, the second action request message further including a second browser session identifier of the active web browsing session and a second security token, the second security token including a first identifier and a second identifier, the first and second identifiers of the second security token being different from each other, the second action request message transmitted in association with the active web browsing session;

comparing the first identifier of the second security token to the second browser session identifier and comparing the second identifier of the second security token to the second action request identifier of the second action request message, wherein the second security token is validated without performing a server database query; and performing the requested action in response to the first identifier of the second security token matching the second browser session identifier and the second identifier of the second security token matching the second action request identifier.

2. The method recited in claim 1, wherein the first browser session identifier is a session identifier, and wherein the security token message and the first action request message are transmitted within the active web browsing session.

3. The method recited in claim 2, wherein the active web browsing session is associated with a session key stored at the server, and wherein the first browser session identifier and the first action request identifier are encrypted using the session key to create the first security token.

4. The method recited in claim 3, wherein comparing the first identifier of the second security token to the second browser session identifier and comparing the second identifier of the second security token to the second action request identifier comprises:

decrypting the second security token to create a decrypted security token, the decrypted security token comprising the first identifier of the second security token and the second identifier of the second security token, determining whether the first identifier of the second security token matches the second browser session identifier, and determining whether the second identifier of the second security token matches the second action request identifier.

5. The method recited in claim 4, the method further comprising:

when the first identifier of the second security token does not match the second browser session identifier or the second identifier of the second security token does not match the second action request identifier, storing an indication of which of the first and second identifiers of the second security token did not match.

6. The method recited in claim 2, wherein the active web browsing session is associated with a session key stored at the server, and wherein the first browser session identifier and the first action request identifier are hashed using the session key to create the first security token.

7. The method recited in claim 6, the method further comprising:

determining whether the first security token matches the second security token, wherein the determination includes:

hashing the second browser session identifier and the second action request identifier to create a third security token that matches the first security token, and determining whether the third security token matches the second security token.

8. The method recited in claim 1, wherein one or both of the first browser session identifier and the first action request identifier are modified using a cryptographic salt value, and wherein the first security token further comprises the cryptographic salt value.

9. The method recited in claim 1, wherein the first action request message is a hypertext markup language (HTML) form submission using a hypertext transfer protocol (HTTP) GET request method or an HTTP POST request method, and wherein the first action request identifier comprises a uniform resource indicator (URI) at which the HTML form is capable of being submitted.

10. The method recited in claim 1, wherein the requested action includes a transmission of a web page from the server to the client machine, and wherein the second action request identifier comprises a uniform resource indicator that specifies an address of the web page.

11. The method recited in claim 1, wherein the server is operable to provide on-demand computing services to a plurality of entities in communication with the server, and wherein the client machine is associated with a first one of the entities.

12. The method recited in claim 11, wherein data associated with the plurality of entities is stored in a multi-tenant database system accessible via the on-demand computing services environment.

13. One or more non-transitory computer readable media having instructions stored thereon, the instructions when executed configured to cause a method to be performed for communicating between a client machine and a server during an active web browsing session, the method comprising:

transmitting, during an active web browsing session between a web browser of a client machine and a website provided by a server of a first network domain, the active web browsing session being a time during which communications are established between the client machine and the server for exchanging information, a security token message from the server to the client machine, the security token message including a first security token, the first security token comprising a first browser session identifier that identifies the active web browsing session, the first security token further comprising a first action request identifier associated with a first action request message configured to be sent from the client machine to the server to request that an action be performed on the server to modify information stored by the server, wherein the security token message is transmitted to the client machine without storing the first security token in a persistent storage location on the server;

receiving, during the active web browsing session, a second action request message including a second action request identifier at the server, the second action request message further including a second browser session identifier of the active web browsing session and a second security token, the second security token including a first identifier and a second identifier, the first and second identifiers of the second security token being different from each other, the second action request message transmitted in association with the active web browsing session;

comparing the first identifier of the second security token to the second browser session identifier and comparing the second identifier of the second security token to the second action request identifier of the second action request message, wherein the second security token is validated without performing a server database query; and performing the requested action in response to the first identifier of the second security token matching the second browser session identifier and the second identifier of the second security token matching the second action request identifier.

14. The one or more non-transitory computer readable media recited in claim 13, wherein the first browser session identifier is a session identifier, and wherein the security token message and the first action request message are transmitted within the active web browsing session.

15. The one or more non-transitory computer readable media recited in claim 14, wherein the active web browsing session is associated with a session key stored at the server, and wherein the first browser session identifier and the first action request identifier are encrypted using the session key to create the first security token.

16. The one or more non-transitory computer readable media recited in claim 15, wherein comparing the first identifier of the second security token to the second browser session identifier and comparing the second identifier of the second security token to the second action request identifier comprises:

decrypting the second security token to create a decrypted security token, the decrypted security token comprising the first identifier of the second security token and the second identifier of the second security token, determining whether the first identifier of the second security token matches the second browser session identifier, and determining whether the second identifier of the second security token matches the second action request identifier.

17. The one or more non-transitory computer readable media recited in claim 16, the instructions further comprising:

when the first identifier of the second security token does not match the second browser session identifier or the second identifier of the second security token does not match the second action request identifier, storing an indication of which of the first and second identifiers of the second security token did not match.

18. The one or more non-transitory computer readable media recited in claim 14 wherein the active web browsing session is associated with a session key stored at the server, and wherein the first browser session identifier and the first action request identifier are hashed using the session key to create the first security token.

19. The one or more non-transitory computer readable media recited in claim 18, the method further comprising:

determining whether the first security token matches the second security token, wherein the determination includes:

hashing the second browser session identifier and the second action request identifier to create a third security token that matches the first security token, and determining whether the third security token matches the second security token.

20. The one or more non-transitory computer readable media recited in claim 13, wherein one or both of the first browser session identifier and the first action request identifier are modified using a cryptographic salt value, and wherein the first security token further comprises the cryptographic salt value.

21. The one or more non-transitory computer readable media recited in claim 13, wherein the first action request message is a hypertext markup language (HTML) form submission using a hypertext transfer protocol (HTTP) GET request method or an HTTP POST request method, and wherein the first action request identifier comprises a uniform resource indicator (URI) at which the HTML form is capable of being submitted.

22. A system comprising:
a client machine including a hardware processor; and
a server in communication with the client machine via a network, the server being configured to:
transmit, during an active web browsing session between a web browser of a client machine and a website provided by a server of a first network domain, the active web browsing session being a time during which communications are established between the client machine and the server for exchanging information, a security token message from the server to the client machine, the security token message including a first security token, the first security token comprising a first browser session identifier that identifies the active web browsing session, the first security token further comprising a first action request identifier associated with a first action request message configured to be sent from the client machine to the server to request that an action be performed on the server to modify information stored by the server, wherein the security token message is transmitted to the client machine without storing the first security token in a persistent storage location on the server;
receive, during the active web browsing session, a second action request message including a second action request identifier at the server, the second action request message further including a second browser session identifier of the active web browsing session and a second security token, the second security token including a first identifier and a second identifier, the first and second identifiers of the second security token being different from each other, the second action request message transmitted in association with the active web browsing session;
compare the first identifier of the second security token to the second browser session identifier and comparing the second identifier of the second security token to the second action request identifier of the second action request message, wherein the second security token is validated without performing a server database query; and
perform the requested action in response to the first identifier of the second security token matching the second browser session identifier and the second identifier of the second security token matching the second action request identifier.

23. The system recited in claim 22, wherein the first browser session identifier is a session identifier, and wherein the security token message and the first action request message are transmitted within the active web browsing session.

24. The system recited in claim 23, wherein the active web browsing session is associated with a session key stored at the server, and wherein the first browser session identifier and the first action request identifier are encrypted using the session key to create the first security token.

25. The system recited in claim 24, wherein comparing the first identifier of the second security token to the second browser session identifier and comparing the second identifier of the second security token to the second action request identifier comprises:
decrypting the second security token to create a decrypted security token, the decrypted security token comprising the first identifier of the second security token and the second identifier of the second security token,
determining whether the first identifier of the second security token matches the second browser session identifier, and
determining whether the second identifier of the second security token matches the second action request identifier.

26. The system recited in claim 25, the server being further configured to:
when the first identifier of the second security token does not match the second browser session identifier or the second identifier of the second security token does not match the second action request identifier, storing an indication of which of the first and second identifiers of the second security token did not match.

27. The system recited in claim 23, wherein the active web browsing session is associated with a session key stored at the server, and wherein the first browser session identifier and the first action request identifier are hashed using the session key to create the first security token.

28. The system recited in claim 27, wherein the server is further configured to:
determine whether the first security token matches the second security token, wherein the determination includes:
hashing the second browser session identifier and the second action request identifier to create a third security token that matches the first security token, and
determining whether the third security token matches the second security token.

29. The system recited in claim 22, wherein one or both of the first browser session identifier and the first action request identifier are modified using a cryptographic salt value, and wherein the first security token further comprises the cryptographic salt value.

* * * * *